United States Patent [19]

Piane, Sr.

[11] Patent Number: 5,241,900
[45] Date of Patent: Sep. 7, 1993

[54] MULTIPLE UNIT WOK APPARATUS INCLUDING LIDS

[75] Inventor: Robert A. Piane, Sr., Wilmington, Del.

[73] Assignee: Piane Equipment Co., Inc., Wilmington, Del.

[21] Appl. No.: 8,534

[22] Filed: Jan. 25, 1993

Related U.S. Application Data

[63] Continuation-in-part of Ser. No. 484,898, Feb. 26, 1990.

[51] Int. Cl.⁵ .............................................. A47J 37/10
[52] U.S. Cl. ......................................... 99/422; 99/448;
99/339; 126/373; 126/390; 220/4.23; 220/4.24;
220/23.8; 220/912; D7/354; D7/357
[58] Field of Search ................. 99/422, 424, 425, 446,
99/448, 375, 397; 126/390, 373; 206/509, 525,
526; 219/525, 432; 220/4.21–4.25, 23.2, 23.4,
23.8, 912; 426/523, 114; D7/354, 357

[56] References Cited

U.S. PATENT DOCUMENTS

| | | | |
|---|---|---|---|
| 75,095 | 3/1868 | Whitehouse | 220/425 |
| D. 158,214 | 4/1950 | O'Callaghan | D7/357 |
| D. 167,077 | 6/1952 | Gunther | 99/339 X |
| D. 181,298 | 10/1957 | Lax | D7/355 |
| 240,138 | 4/1881 | Jackson | D7/357 X |
| 381,784 | 4/1888 | Hornish | 99/422 X |
| 781,081 | 1/1905 | MacFate | 99/422 |
| 863,536 | 8/1907 | Hudson | 220/23.4 |
| 993,169 | 5/1911 | Hudson | 99/424 |
| 1,072,892 | 9/1913 | Wilson | 99/426 |
| 1,204,682 | 11/1916 | Nash | 99/424 |
| 1,292,476 | 1/1919 | Kavanaugh | D7/357 X |
| 1,855,075 | 4/1932 | Virneburg | D7/357 X |
| 2,006,938 | 7/1935 | Birkenhauer | D7/357 X |
| 2,078,165 | 4/1937 | Schwartz | D7/357 X |
| 2,674,389 | 4/1954 | Baker et al. | 220/23.4 |
| 2,674,536 | 4/1954 | Fisher | 99/448 |
| 2,722,173 | 1/1955 | Cunningham | 126/390 |
| 3,007,595 | 11/1961 | Remley | 99/448 |
| 3,511,433 | 3/1968 | Andrews et al. | 220/4 E |
| 3,704,663 | 12/1972 | Shull et al. | 99/448 X |
| 3,719,507 | 3/1973 | Bardeau | 99/448 |
| 3,908,828 | 9/1975 | Lohwasser | 220/23.4 X |
| 4,096,986 | 6/1978 | Florian | 220/423 |
| 4,176,593 | 12/1979 | Terzian | D7/357 X |
| 4,515,074 | 5/1985 | Iverson | 99/448 |
| 4,574,777 | 3/1986 | Bohl | 126/390 |
| 4,666,727 | 5/1987 | Wang | 99/425 |
| 4,908,487 | 3/1990 | Sarnoff et al. | 99/440 X |
| 5,046,659 | 9/1991 | Warburton | 220/4.23 X |

Primary Examiner—Timothy F. Simone
Attorney, Agent, or Firm—E. Alan Uebler

[57] ABSTRACT

A multiple unit wok apparatus is provided for simultaneously cooking several separate ingredients and, when cooked, the ingredients from each wok bowl can be easily mixed together if desired. The individual wok units are attached together. The individual wok units each have mating lids which, when in place, mate with each wok bowl and form a sealing covering over the bowls.

2 Claims, 2 Drawing Sheets

MULTIPLE UNIT WOK APPARATUS INCLUDING LIDS

CROSS-REFERENCE TO RELATED APPLICATION

This application is a continuation-in-part of prior copending application Ser. No. 07/484,898, filed Feb. 26, 1990.

BACKGROUND OF THE INVENTION

This invention relates to apparatus for cooking food, namely the wok, especially suitable for cooking Oriental foods.

Cooking food in a wok is an ancient art. The vessel serves many functions and therefore replaces many Western utensils. To prepare many recipes properly, a cook generally needs two woks, one for oil and one for water steaming.

A single wok is normally about fourteen inches in diameter and is made of carbon steel or other metals including stainless steel, cast iron, aluminum and copper.

The basic techniques of wok cooking include stir-frying, deep frying and steaming. Stir-frying involves cooking pre-cut pieces of food in small amounts of oil over high heat for short periods of time. Deep frying involves the use of considerably more oil than stir-frying, but this oil, rather than the hot surface of the wok, acts as the heat-transfer medium. The oil should be heated to approximately 375° F. before the food can be added. Surprising and pleasing results can often be achieved with this method. In steaming, the wok is used as a water vessel in which either a perforated aluminum tray or bamboo basket is placed. The food platter is placed on top of the tray or basket, covered and steamed over high heat.

One of the objects of the present invention is to provide means for a cook to conveniently and easily employ more than one of these methods of wok cooking simultaneously.

SUMMARY OF THE INVENTION

Multiple unit wok apparatus is provided comprising at least two similar wok bowls affixed together. The individual wok units each have mating lids which, when in place, mate with each wok bowl and form a sealing covering over each bowl. More specifically, a multiple unit wok apparatus is provided comprising at least two similar wok bowls affixed together adjacent an intersecting joint therebetween, the intersecting joint being arcuate downwardly when the apparatus is in the cooking position, thereby allowing cooked or partially cooked foods and juices to be shifted easily from one wok bowl to another by the cook, using a spoon, spatula or other appropriate tool, with substantially no spillage, during cooking. In combination with each wok bowl is a lid having, along a portion of its outer periphery, a downwardly extending, generally semi-circular, bowed partition member, which partition, when a lid is in place, mates with the arcuate joint between the respective bowls and forms a sealing covering over the bowl. The apparatus preferably has two similar wok bowls affixed together, each bowl having, in combination, its respective lid as aforesaid.

DETAILED DESCRIPTION OF THE INVENTION AND PREFERRED EMBODIMENTS WITH REFERENCE TO THE DRAWINGS

A multiple unit wok apparatus is provided for simultaneously cooking several separate ingredients and, when cooked, the ingredients from each wok bowl can be easily mixed together if desired. The individual wok units are attached together. The individual wok units each have mating lids which, when in place, mate with each wok bowl and form a sealing covering over the bowls.

Figure 1:
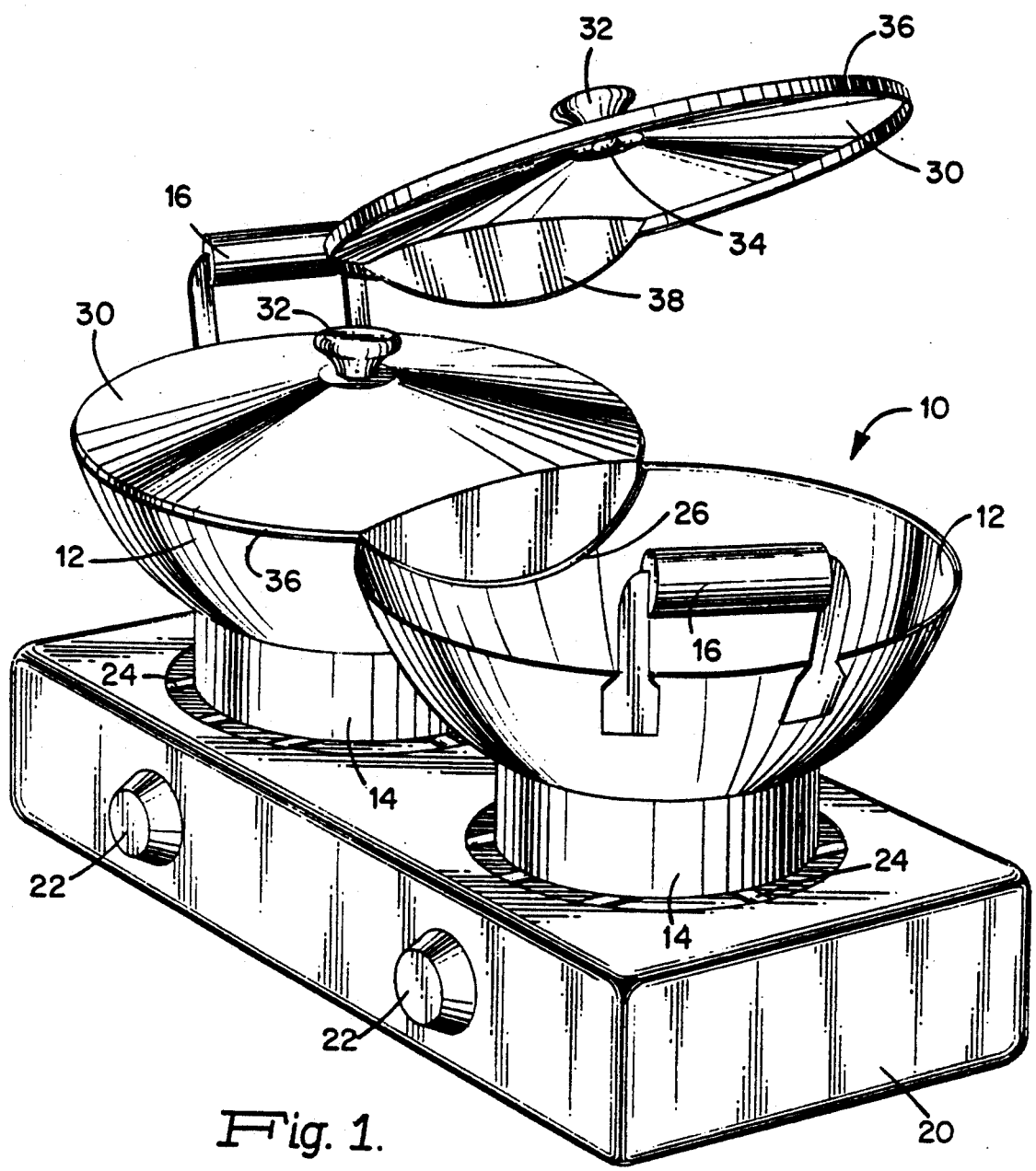
FIG. 1 is a perspective view of a double wok in combination with lids according to the invention.

A detailed description of the invention is best provided with reference to the drawings wherein FIG. 1 is a perspective view of a combination double wok and lids configuration according to the invention. The multiple wok apparatus 10 includes two wok bowls 12, each bowl 12 resting on a base 14 and each bowl 12 having a handle 16. The bowls 12 are connected together, described more fully below. Each bowl has its respective lid 30, also described more fully below.

The double wok and lid combination 10 depicted in FIG. 1 shows the two wok bowls 12 resting on or affixed to the two bases 14 which in turn sit on stove or burner assembly 20. The two bowls may be cast together or individual bowls may be welded together or affixed together at the arcuate joint 26 therebetween by clamps, hinges or by any convenient means.

The bases 14 of the bowls 12 are shown resting on grates 24 of stove 20 having adjustable burner control knobs 22. With the double wok configuration shown, a cook can prepare different dishes in each bowl 12, at different heat levels if necessary and, if desired, the different prepared ingredients can easily be combined in one of the bowls 12 at the appropriate time.

Figure 2:
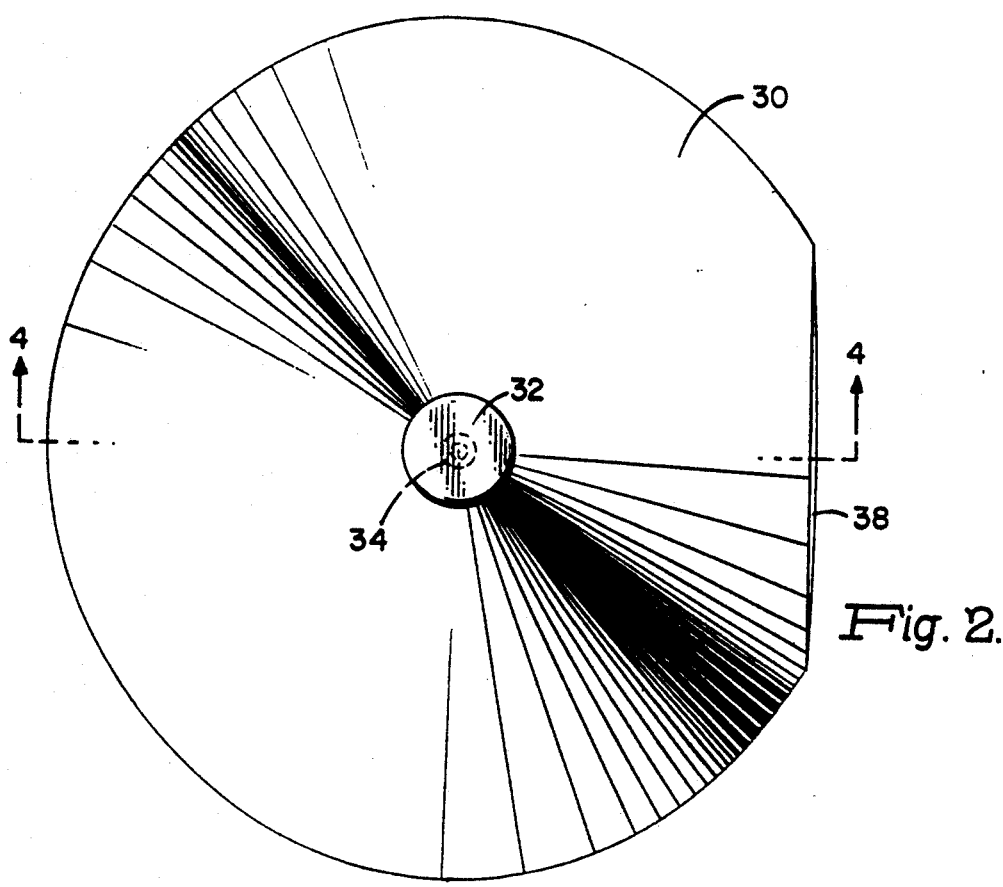
FIG. 2 is a top plan view of one of the lids depicted in FIG. 1.

FIG. 2 is a top plan view of one lid employed in the multiple wok-lid combination according to the invention. Therein is shown lid 30, preferably of aluminum, having handle 32, preferably made of wood such as ash, and affixed to lid 30 by means of screw 34. The flat portion shown along the right side of the lid periphery results from the downwardly extending partition 38, not seen in FIG. 2.

Figure 3:
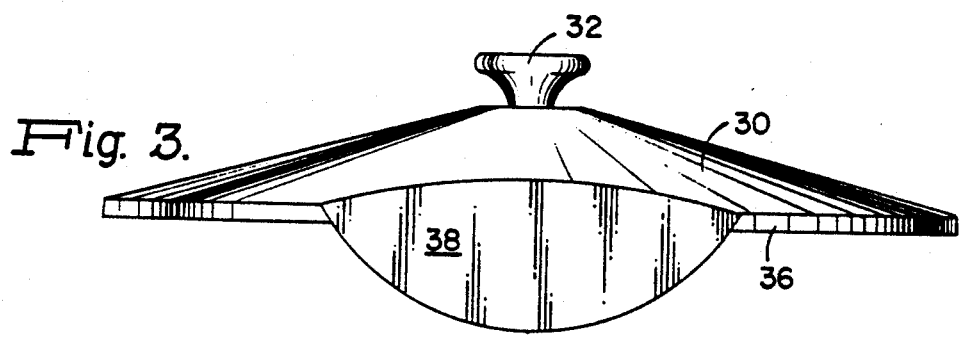
FIG. 3 is a side elevational view of the wok lid shown in FIG. 2.

FIG. 3 is a side elevation of the lid 30 in which the downwardly extending, generally semi-circular, bowed partition member 38 is more clearly seen. This partition member 38 is such that, when the lid 30 is in place over its respective bowl 12, the partition 38 mates with downwardly arcuate joint 26, seen in FIG. 1, forming a sealing covering over wok bowl 12. Handle 32 and lid rim 36 are shown in FIG. 3 for completeness.

Figure 4:
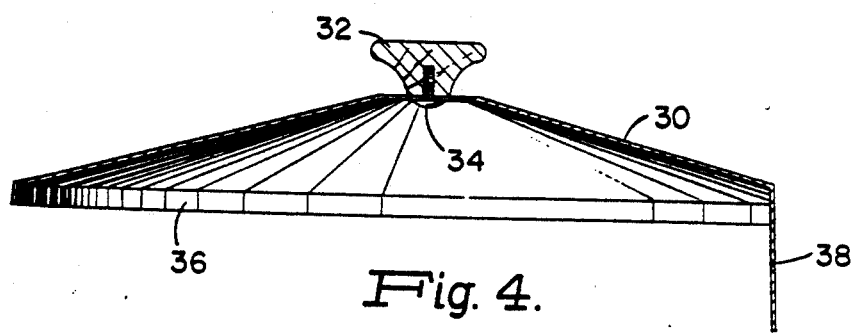
FIG. 4 is a cross-sectional view of the wok lid of FIG. 2 taken along line 4—4 thereof.

FIG. 4 is a cross-sectional view of lid 30 taken along line 4—4 of FIG. 2. Therein is shown lid 30, handle 32, screw holding means 34 and the downwardly extending partition member 38.

When both lids 30 are in place covering their respective bowls 12, the two partitions 38 are in adjacent contact with each other and compliment each other to effect sealing of the two wok bowls 12.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. Multiple unit wok apparatus comprising at least two similar wok bowls affixed together, each individual wok bowl having a mating lid which, when in place, mates with each wok bowl and forms a sealing covering over each bowl, said wok bowls being affixed together adjacent an intersecting joint therebetween, the intersecting joint being arcuate downwardly when the wok apparatus is in the cooking position, thereby allowing cooked or partially cooked foods and juices to be shifted easily from one wok bowl to another by the cook, using a spoon, spatula or other appropriate tool, with substantially no spillage during cooking, wherein, in combination with each wok bowl is a lid, said lid having, along a portion of its outer periphery, a downwardly extending, generally semi-circular, bowed partition member, which partition, when a lid is in place covering a respective wok bowl, mates with the arcuate joint between the respective wok bowls and forms a sealing covering over the bowl.

2. The apparatus of claim 1 having two similar wok bowls affixed together, each bowl having, in combination, its respective lid.

* * * * *